(12) United States Patent
Hariram et al.

(10) Patent No.: US 10,498,675 B2
(45) Date of Patent: Dec. 3, 2019

(54) ENHANCED ELECTRONIC CHAT EFFICIENCY

(71) Applicant: GM GLOBAL TECHNOLOGY OPERATIONS LLC, Detroit, MI (US)

(72) Inventors: Rekha Hariram, Warren, MI (US); Sam Jamal, Dearborn, MI (US); Anthony D. Bolton, Leinster (IE); James A. Miller, Birmingham, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 184 days.

(21) Appl. No.: 15/624,554

(22) Filed: Jun. 15, 2017

(65) Prior Publication Data
US 2018/0367477 A1    Dec. 20, 2018

(51) Int. Cl.
| | |
|---|---|
| *H04L 12/58* | (2006.01) |
| *H04M 3/51* | (2006.01) |
| *H04L 29/06* | (2006.01) |
| *H04L 29/08* | (2006.01) |
| *H04W 4/12* | (2009.01) |

(52) U.S. Cl.
CPC .......... *H04L 51/04* (2013.01); *H04L 51/046* (2013.01); *H04L 51/14* (2013.01); *H04L 65/1016* (2013.01); *H04L 65/1069* (2013.01); *H04L 65/1089* (2013.01); *H04L 67/36* (2013.01); *H04M 3/5183* (2013.01); *H04W 4/12* (2013.01)

(58) Field of Classification Search
CPC ......... H04L 51/04; H04L 51/14; H04L 67/36; H04L 65/1089; H04L 65/1016; H04L 65/1069; H04L 51/046; H04W 4/12; H04M 3/5183
See application file for complete search history.

(56) References Cited

U.S. PATENT DOCUMENTS

| | | | | |
|---|---|---|---|---|
| 5,987,401 | A * | 11/1999 | Trudeau | G06F 17/289 704/2 |
| 5,990,887 | A * | 11/1999 | Redpath | H04L 67/36 709/204 |
| 7,243,078 | B1 * | 7/2007 | Lewis-Hawkins | G06Q 30/016 705/26.41 |
| 2001/0029455 | A1 * | 10/2001 | Chin | G06F 17/273 704/277 |

(Continued)

OTHER PUBLICATIONS

Donnellan, Brendan, "Brand Embassy Launches First Fully-Integrated Live Chat and Social Customer Service Tool", Nov. 1, 2016, Business Wire.*

(Continued)

*Primary Examiner* — Ramy M Osman
(74) *Attorney, Agent, or Firm* — Reising Ethington P.C.; James E Howard

(57) ABSTRACT

A system configured to facilitate an electronic chat session between a user and an agent includes an agent interface device, one or more processors, and non-transitory computer readable memory storing program code. Upon execution of the stored program code, the system displays a chat window on the agent interface device, user and agent messages within the chat window, and pre-message text within the chat window. The pre-message text is displayed while the user is composing an unsent message.

12 Claims, 2 Drawing Sheets

(56) References Cited

U.S. PATENT DOCUMENTS

| | | | | |
|---|---|---|---|---|
| 2007/0168450 | A1* | 7/2007 | Prajapat | H04L 51/063 709/207 |
| 2007/0271525 | A1* | 11/2007 | Han | G06F 3/017 715/786 |
| 2008/0046532 | A1* | 2/2008 | Caspi | G06Q 10/107 709/207 |
| 2008/0243472 | A1* | 10/2008 | DeGroot | G06F 17/289 704/2 |
| 2009/0245500 | A1* | 10/2009 | Wampler | H04M 3/5191 379/265.09 |
| 2012/0034938 | A1* | 2/2012 | Kreitzer | H04L 51/04 455/466 |
| 2013/0346885 | A1* | 12/2013 | Singh | H04L 51/04 715/758 |
| 2013/0346886 | A1* | 12/2013 | Cauchois | H04L 51/046 715/758 |
| 2015/0099491 | A1* | 4/2015 | Jeon | H04W 4/12 455/412.2 |
| 2015/0256675 | A1* | 9/2015 | Sri | H04M 3/5183 379/265.09 |
| 2016/0277329 | A1* | 9/2016 | Gordon | H04L 51/046 |
| 2016/0371756 | A1* | 12/2016 | Yokel | H04L 51/046 |
| 2017/0060407 | A1* | 3/2017 | Kanbe | G06F 3/04883 |
| 2017/0085506 | A1* | 3/2017 | Gordon | H04L 51/046 |
| 2017/0311136 | A1* | 10/2017 | Pattan | H04L 65/1016 |
| 2018/0191903 | A1* | 7/2018 | Yokel | H04M 3/5191 |
| 2018/0225607 | A1* | 8/2018 | Girishankar | H04L 51/14 |
| 2018/0321806 | A1* | 11/2018 | Rodriguez Virgen | H04L 51/043 |
| 2018/0337968 | A1* | 11/2018 | Faulkner | H04L 65/4015 |
| 2018/0367477 | A1* | 12/2018 | Hariram | H04L 51/04 |
| 2019/0014613 | A1* | 1/2019 | Antsev | H04L 65/1069 |
| 2019/0068658 | A1* | 2/2019 | Chiang | H04L 65/1089 |
| 2019/0069142 | A1* | 2/2019 | Chiang | H04W 76/10 |

OTHER PUBLICATIONS

Gallaudet University, "AOL Instant Messaging with Real-Time IM Tutorial", Jan. 15, 2008, Gallaudet University, Technology Access program.*

Ross, Dave, "How AOL Instant Messenger Works", Jan. 15, 2008, HowStuffWorks.*

* cited by examiner

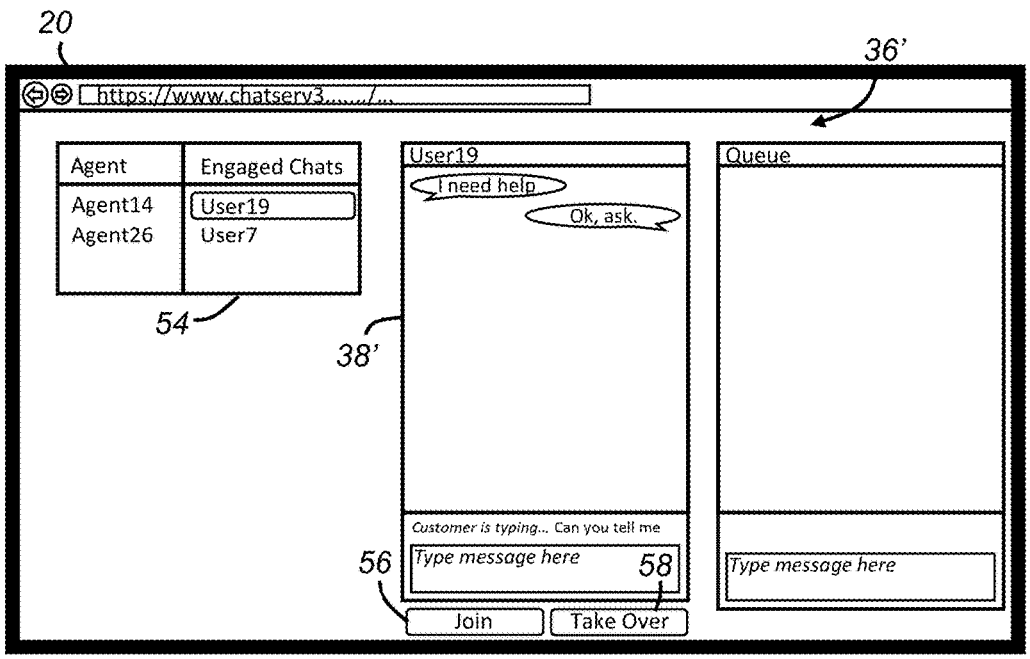
FIG. 3
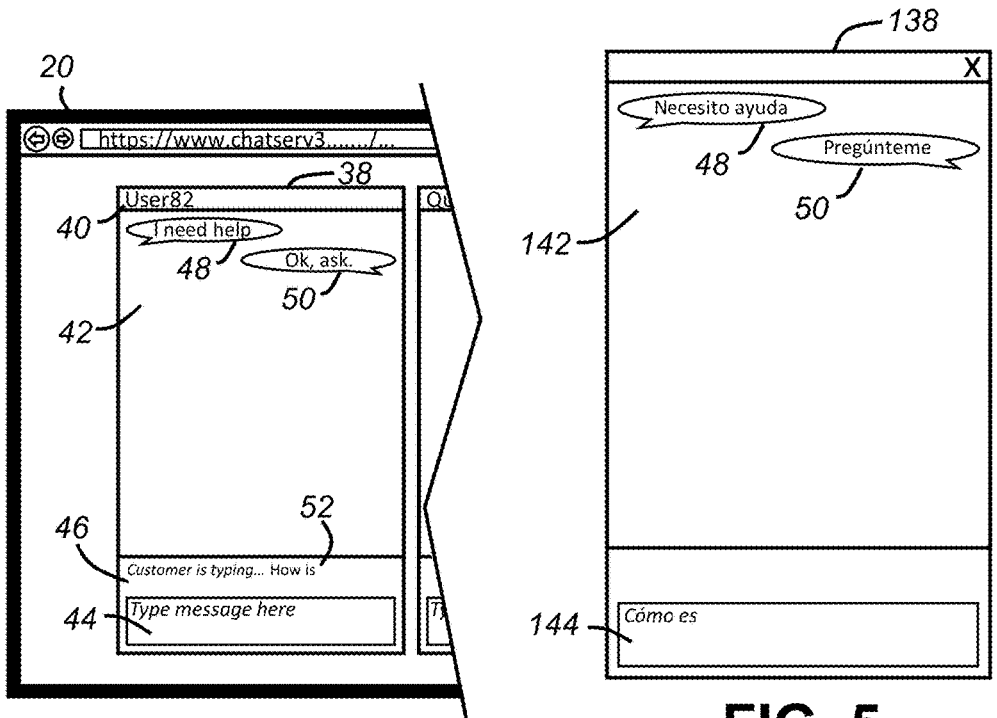
FIG. 4
FIG. 5

ENHANCED ELECTRONIC CHAT EFFICIENCY

INTRODUCTION

The present invention relates to improvements to electronic chat sessions. Electronic chat sessions have emerged as a form of electronic communication involving the mutual exchange of readable messages between at least two entities via electronic devices that present the messages to device users. Chat sessions have become particularly useful in on-line customer service situations where a live customer service agent can engage in an electronic conversation with a customer while the customer is at a computer visiting the website of a particular company, for example. Chat sessions thus allow customers to make inquiries and receive responses in minutes rather than hours or days, as is usually the case with email inquiries. Chat sessions can also inherently provide an electronically written record of the conversation, unlike telephone calls.

SUMMARY

According to an embodiment of the invention, there is provided a system configured to facilitate an electronic chat session between a user and an agent. The system includes an agent interface device configured to be connected with a user interface device via one or more network connections. The agent interface device includes a display and is configured to receive text input from the agent. The system includes one or more processors and non-transitory computer readable memory storing program code that, upon execution by one of the processors, causes the system to: display a chat window on the display of the agent interface device, display within the chat window at least a portion of a conversation between the user and the agent, and display within the chat window pre-message text input at the user interface device while the user is composing an unsent message. The conversation comprises text-containing user messages composed at and sent from the user interface device and text-containing agent messages composed at and sent from the agent interface device during the chat session.

In some embodiments, user messages are composed in a first language and the program code further causes the system to display the user messages in the chat window in a different second language.

In some embodiments, agent messages are composed in the second language and the program code further causes the agent messages to be displayed at the user interface device in the first language.

In some embodiments, the program code further causes the system to display the pre-message text in the second language.

In some embodiments, the system is configured to facilitate a plurality of electronic chat sessions, each chat session being between one of a plurality of different users and the same agent. The agent interface device is configured to be connected with a plurality of user interface devices via one or more network connections, and the program code further causes the system to simultaneously display a plurality of chat windows on the display of the agent interface device and display within each one of the chat windows at least a portion of a conversation between an individual one of the users and the agent, whereby the agent can simultaneously participate in the plurality of chat sessions.

In some embodiments, the system includes a secondary interface device configured to be connected with the user interface device and the agent interface device via one or more network connections. The secondary interface device includes a display, and the program code further causes the system to: display a chat monitor window on the display of the secondary interface device, display within the chat monitor window at least a portion of the conversation between the user and the agent, update the displayed conversation in the chat window when an additional user message or agent message is sent, and simultaneously update the displayed conversation in the chat monitor window when the additional user message or agent message is sent. An additional agent can monitor the chat session in real-time via the secondary interface device.

In some embodiments, the system is configured to facilitate an additional electronic chat session between the agent and the additional agent, and the program code further causes the system to: display an additional chat window on the display of the agent interface device, and display within the additional chat window at least a portion of a coaching conversation between the agent and the additional agent. The coaching conversation comprises messages composed at and sent from the secondary interface device and messages composed at and sent from the agent interface device during the additional chat session, and the additional agent can coach the agent to help guide the conversation between the agent and the user.

In some embodiments, the system is configured to allow the additional agent to join the electronic chat session. The program code further causes the system to: display within the chat window at least a portion of a three-way conversation between the user, the agent, and the additional agent. The conversation comprises text-containing user messages composed at and sent from the user interface device, text-containing agent messages composed at and sent from the agent interface device, and text-containing additional agent messages composed at and sent from the secondary interface device.

In some embodiments, the system is configured to allow the additional agent to replace the agent in the electronic chat session. The program code further causes the system to: update the displayed conversation in the chat monitor window when an additional user message or an additional message from the additional agent is sent, thereby continuing the conversation to include messages composed at and sent from the secondary and to exclude any additional messages sent from the agent interface device.

According to an embodiment of the invention, there is provided a system configured to facilitate electronic chat sessions. The system includes a server configured to simultaneously host a plurality of user-initiated chat sessions and a plurality of agent interface devices. Each user-initiated chat session is established between an individual user at a user interface device and an agent at one of the plurality of agent interface devices via the server. The system includes a secondary interface device connected to the server and configured to selectively monitor each one of the established chat sessions. The server is configured to establish each chat session such that more than one of the chat sessions is between different individual users and the same agent and are simultaneously displayed at one of the plurality of agent interface devices. Text input by the user in each chat session is visible to the agent while the user is composing an unsent message.

In some embodiments, the system is configured to allow an additional agent using the secondary interface device to establish a separate chat session with an agent at any one of the agent interface devices.

In some embodiments, the system is configured to allow an additional agent using the secondary interface device to replace the agent in any one of the established chat sessions to continue an ongoing conversation between the agent and one of the users.

Within the scope of this application it is envisaged that the various aspects, embodiments, examples, features and alternatives set out in the preceding paragraphs, in the claims and/or in the following description and drawings may be taken independently or in any combination thereof. For example, features disclosed in connection with one embodiment are applicable to all embodiments, except where there is incompatibility of features.

BRIEF DESCRIPTION OF THE DRAWINGS

One or more embodiments of the invention will hereinafter be described in conjunction with the appended drawings, wherein like designations denote like elements, and wherein:

FIG. 3 shows a display of a supervisory agent interface device and illustrates efficiency enhancing features for electronic chat sessions, including chat session monitoring;

FIG. 4 shows a portion of a display of an agent interface device and illustrates efficiency enhancing features for electronic chat sessions, including real-time translation; and FIG. 5 shows a chat window of a user interface device engaged in a chat session with the agent interface device of FIG. 4.

DETAILED DESCRIPTION

The system described below includes various improvements to electronic chat systems, including real-time display of messages to an agent while being composed by a user, translation of messages from one language to another before being displayed to the agent, simultaneous displaying more than one chat session conversation to the same agent, and/or monitoring of chat sessions by an additional agent for purposes of coaching, intervention, or changing agents involved in the chat session. Various aspects of the invention include but are not limited to the described system, a method of facilitating chat sessions using the system, a non-transitory computer readable memory or other device storing program code to operate the system and/or perform the method, and various combinations of individual elements of the system, method, or device.

Figure 1:
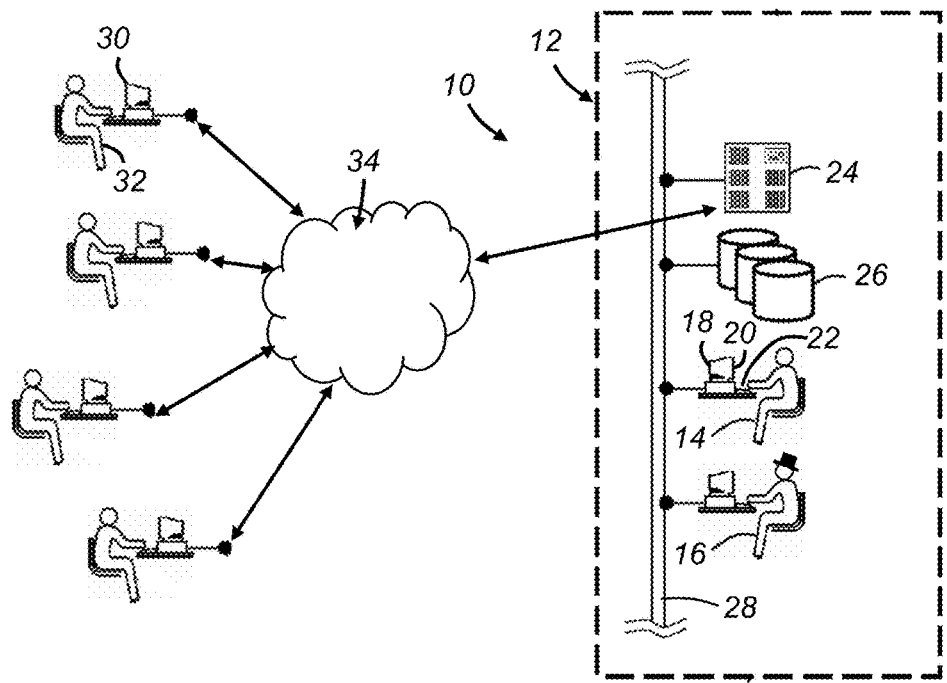
FIG. 1 schematically illustrates an exemplary system configured to facilitate electronic chat sessions.

With reference to FIG. 1, there is shown one example of a system 10 configured to facilitate one or more electronic chat sessions over a network. The particularly illustrated system 10 includes a service center 12 manned by one or more agents 14 and one or more supervisory agents 16. Each agent 14, 16 operates an interface device 18 that includes a display 20 and an input device 22. The illustrated interface devices 18 are personal computers including a monitor as the display 20 and keyboard as the input device 22. Other interface devices may be employed, such as electronic tablets or mobile phones having touch screens as the display and the input device, for example, or interface devices employing a speech-to-text input device. The illustrated service center 12 also includes one or more servers 24 and/or databases 26. These components may be coupled to one another and to the agent interface devices 18 via a wired or wireless local area network 28. Databases 26 can store information such as customer account information, profile records, behavioral patterns, product information, part catalogs, or other pertinent information. Although the illustrated embodiment is described as it would be used in conjunction with the manned service center 12 housing service agents 14, 16, it will be appreciated that the service center can instead be virtual with agents in various physical locations connected to the servers 24 and/or databases 26 via one or more wired or wireless network connections. In some cases, the servers 24 and/or databases may be located remotely from a manned service center housing a staff of agents.

Servers 24 are configured to serve multiple clients, which in this case include the agent interface devices 18 along with similarly configured user interface devices 30 having respective displays and input devices employed by users 32 to initiate and participate in chat sessions. Each user interface device 30 is ultimately connected with one of the agent interface devices 18 via one or more network connections when a chat session is established. In this example, a portion of the network connections are provided by an external network 34, such as the Internet. This is not always the case, such as in cases where chat sessions are established within a building—i.e., between an employee and a company IT specialist.

The system 10 also generally includes one or more computer processors capable of executing program code, along with program code stored somewhere within the system, such as in non-transitory computer readable memory (e.g., RAM, ROM, magnetic or optical disc, etc.). For example, executable program code configured to cause the system to establish and control the functionality of electronic chat sessions between users 32 and agents 14 may be stored in computer readable memory at servers 24 and/or at any of the agent or user interface devices 18, 30. Portions of such program code may be stored at one location, such as a server 24, and transmitted to a different location, such as an interface device 18, 30, where it is executed by a local processor.

Figure 2:
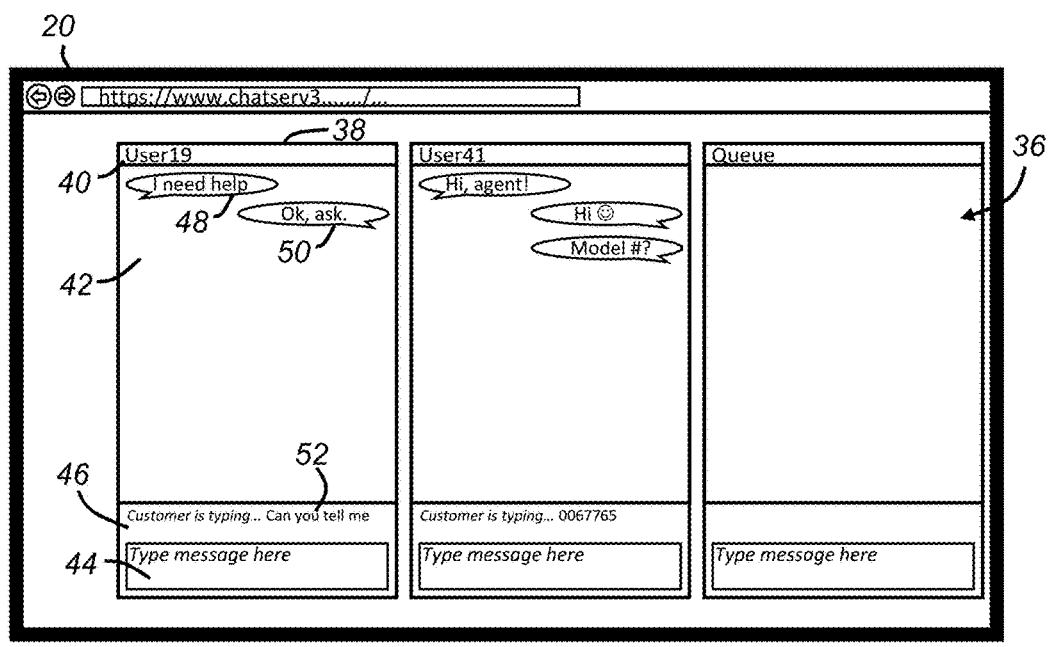
FIG. 2 shows a display of an agent interface device and illustrates efficiency enhancing features for electronic chat sessions, including a message preview area.

FIG. 2 shows an example of the display 20 as viewed by the agent 14 using the agent interface device 18. In this example, the agent interface device 18 is a personal computer running a network browser in which an agent-specific graphical interface 36 is presented to allow the agent to establish, participate in, and terminate chat sessions with users. In this example, three chat windows 38 are simultaneously displayed, two of which are being used by the agent to participate in different established chat sessions. Each chat window 38 includes a user information area 40, a conversation area 42, a message composition area 44, and a message preview area 46.

Identification information related to the user participating in the chat session with the agent is displayed in the information area 40, such as name, user ID, email address, phone number, and language. An ongoing conversation between the user and the agent is displayed in the conversation area 42. The composition area 44 is where the agent can place a cursor or other indicator to compose a message by entering text and/or other symbols. Each conversation includes user messages 48 and agent messages 50. The agent messages 50 are composed by the agent at the agent interface device and sent from the agent interface device after being composed. While text or other content intended to be part of a message is in the composition area 44 of the chat window, the message is described as being composed or as an unsent message. Unsent messages do not appear in the conversation area 42 of the chat window 38 while being composed and are this not considered part of the conversation. Only when the agent sends the message, by pressing enter on a keyboard for example, does the message 50 appear in the conversation area 42 and simultaneously disappear from the composition area 44 to become part of the conversation.

The same is true at the user interface device; a user message 48 does not appear in the conversation area 42 of the chat window 38 (or in a corresponding message area of a similar chat window appearing on the user interface device) and is not part of the conversation until the user sends the message. The user and agent messages 48, 50 may be displayed in the conversation area 44 sequentially in the order in which they are sent and may include some indicator regarding which chat session participant sent the message. In this example, user messages 48 are displayed on the left side of the conversation area 42, and agent messages 50 are displayed on the right side of the conversation area.

The example of FIG. 2 illustrates at least two exemplary features that can enhance chat session efficiency. As one example, pre-message text 52 is displayed in the message preview area 46 while the user is composing an unsent message at the user interface device involved in the chat session. In other words, where the user interface device includes a keyboard as the input device, each letter typed by the user appears as pre-message text 52 in the message preview area 46 of the chat window 38 displayed on the agent display 20 as it is being typed. This feature allows the agent to begin using the information to be contained in the message before it becomes part of the conversation. For example, in FIG. 2 the agent asks the user for a model number in the conversation and can see the model number as it is being entered by the user. The agent can thus begin entering the model number into a database search engine, for example, in real-time without waiting for the user to finish and send the message. One manner of implementing this feature is via execution of program code at the user interface device which, when executed by a processor, collects information about the characters entered in a message composition area on the user interface device each time another character is entered, and sends the collected information via the established chat session connection to the agent interface device to be displayed. Displaying the pre-message text 52 on the agent display 20 may be performed by similar execution of program code at the agent interface device. The message preview area 46 may be located elsewhere within the chat window 38, such as in the conversation area 42, so that the pre-message text is displayed in the eventual location of the sent message.

Another efficiency-enhancing feature is the non-overlapping nature of the plurality of chat windows 38. This allows the agent to view more than one chat window 38, and thus more than one chat session conversation, at once. Efficiency is enhanced by the agent being able to compose a new message in one chat window while awaiting the user to compose or send a new message in a different chat window. The non-overlapping nature of the chat windows also helps prevent the agent from noticing when a new message appears in a chat window other than the one with which the agent is engaged at any moment in time. Further, when a new user-initiated chat session is assigned to the agent, it will appear in the presently unused chat window rather than being opened as a new window on the display that overlaps and obstructs the view of the active chat windows. One manner of including this feature is having the agent-specific graphical interface 36 configured so that the chat windows 38 are embedded in the interface.

FIG. 3 shows an example of the display 20 of a secondary agent interface device as viewed by the supervisory agent 16 using the secondary agent interface device. In this example, the secondary agent interface device is also a personal computer running a network browser in which a supervisory agent-specific graphical interface 36' is presented to allow the supervisory agent to monitor, participate in, or take over a chat session conversation in which any of a plurality of other agents is engaged in. A chat selection area 54 is displayed on the supervisory agent display to allow the supervisory agent to select which of the other agents and which of the ongoing chat sessions he wishes to monitor. The supervisory agent can, for example, click on or otherwise select the chat session to be monitored. The selected chat session is then displayed in a chat monitor window 38', which is essentially a duplicate of the chat window 38 being displayed on the display of the chosen agent.

The exemplary graphical interfaces also presents soft buttons 56, 58 to allow the supervisory agent to respectively join the on-going conversation or take over the chat session by removing the engaged agent from the session and inserting himself. When the supervisory agent joins the conversation, the chat monitor window 38' becomes an active chat window as described in conjunction with FIG. 2. A three-way conversation can then occur with messages composed and sent by all three of the user, the agent, and the supervisory agent being displayed in the conversation area of the chat window. Similarly, when the supervisory agent takes over the conversation, the chat monitor window 38' becomes an active chat window as described in conjunction with FIG. 2. Afterward, only messages from the user and the supervisory agent are displayed in the conversation area of the chat window with no further messages from the originally engaged agent. Also, on the display of the replaced agent, the chat session taken over by the supervisory agent may be removed, freeing up the agent for a new chat session with a different user.

Alternatively, the supervisory agent may coach the agent whose conversation is being monitored rather than join or take over the conversation. In one example, an additional soft button such as those illustrated in FIG. 3 (elements 56, 58) is presented to allow the supervisory agent to establish a new and separate chat session with the agent being monitored. This new chat session may for example be established in the queue chat windows in FIGS. 2 and 3. This can allow the supervisory agent to offer suggestions to the agent engaged in the monitored conversation without the user being aware of the secondary conversation. These supervisory agent features described in conjunction with FIG. 3 enhance efficiency by allowing the supervisory agent to intervene in an ongoing chat session in several different ways to help redirect a conversation that is escalating toward customer/user anger, for example.

FIG. 4 shows example of the display 20 of an agent who does not speak Spanish as viewed by the agent 16 when engaged in a chat session conversation with a Spanish-speaking user. Only a portion of the display is illustrated in FIG. 4, showing the chat window 38, while FIG. 5 illustrates an example of a corresponding chat window 138 being displayed on the user interface device during the same chat session. As shown, each message 48, 50 displayed in the conversation area 42 of the chat window 38 may be displayed in English or some other language selected by the agent, even though the user is composing and sending the user messages 48 in Spanish or some other non-agent language. FIG. 4 also illustrates an example in which the pre-message text 52 is translated to the agent's preferred language before being displayed in the message preview area 46 of the chat window. This may be performed by the system on a word-by-word basis rather than letter-by-letter as in the example of FIG. 2.

This real-time translation feature of the system helps improve efficiency by allowing any agent to engage in a chat session conversations with a user who speak a language the agent does not, thereby reducing or eliminating the need for agents who speak languages not often encountered in chat sessions. For instance, if an average of 10% of typical chat session user are Spanish-speaking, the service center would normally require about 10% of the agents to speak Spanish. This would lead to times when the Spanish-speaking agents are idle due to low demand for Spanish chat sessions. With the described translation functionality, the service center may employ only 5% or less Spanish-speaking agents to more fully use their Spanish-speaking services and reduce idle time. When Spanish chat sessions are in higher demand temporarily, non-Spanish speaking agents can engage with Spanish-speaking users. The feature may be implemented via use of machine translation program code being executed by one of the system processors, such as a server processor, an agent interface device processor, or another system processor configured to facilitate foreign language chat sessions. Of course, translation can be performed from nearly any first language to nearly any second language and is not limited to English and Spanish.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A system configured to facilitate an electronic chat session between a user and an agent, the system comprising:
an agent interface device configured to be connected with a user interface device via one or more network connections, each of the agent interface device and the user interface device comprising a display and each interface device being configured to receive text input from the respective agent and user;
one or more processors; and
non-transitory computer readable memory storing program code that, upon execution by one of the processors, causes the system to:

establish a user-initiated chat session between the user and the agent;
display a chat window comprising a conversation area and a message composition area on the display of the agent interface device;
display a chat window comprising a conversation area and a message composition area on the display of the user interface device;
display within the conversation area of each chat window at least a portion of a conversation between the user and the agent, wherein the conversation comprises text-containing user messages composed at and sent from the user interface device and text-containing agent messages composed at and sent from the agent interface device during the chat session;
display within the message composition area of each chat window an unsent message including text input from the respective agent and user, wherein each unsent message is not part of the conversation and is not displayed in the conversation area of the chat window displayed on the display of the user interface device;
remove the unsent message from the respective message composition area to be part of the conversation displayed in the conversation area of each chat window when the respective agent or user sends the respective text-containing message; and
display within the chat window on the display of the agent interface device the unsent message being displayed in the message composition area of the chat window displayed on the user interface device so that the agent can view pre-message text input at the user interface device while the user is composing the unsent message that is not part of the conversation displayed in the conversation area of the chat window displayed on the user interface device,
wherein the system is further configured to establish an additional chat session between an additional agent at a secondary interface device and the agent participating in the user-initiated chat session, a secondary conversation between the agent and the additional agent being displayed on the agent interface device and on the secondary interface device but not on the user interface device,
wherein the system is further configured to allow the additional agent to monitor the user-initiated chat session at the secondary interface device and to join the user-initiated chat session such that a three-way conversation is established in the already-displayed chat windows that include the conversation between the agent and the user, and
wherein the system is further configured to allow the additional agent to replace the agent in the user-initiated chat session so that the conversation between the agent and the user continues with the additional agent in place of the agent.

2. A system as defined in claim 1, wherein the user messages are composed in a first language in the message composition area of the chat window displayed on the user interface device before being displayed in the first language in the conversation area of the chat window displayed on the user interface device and the program code further causes the system to display the user messages in the conversation area of the chat window displayed on the agent interface device in a different second language.

3. A system as defined in claim 2, wherein the agent messages are composed in the second language in the message composition area of the chat window displayed on the agent interface device before being displayed in the second language in the conversation area of the chat window displayed on the agent interface device and the program code further causes the agent messages to be displayed in the conversation area of the chat window displayed on the user interface device in the first language.

4. A system as defined in claim 2, wherein the program code further causes the system to display in the second language and within the chat window on the display of the agent interface device the unsent message being displayed in the first language in the message composition area of the chat window displayed on the user interface device so that the agent can view the pre-message text in the second language.

5. A system as defined in claim 1, the system being configured to facilitate a plurality of electronic chat sessions, each chat session being between one of a plurality of different users and the same agent,
wherein the agent interface device is configured to be connected with a plurality of user interface devices via one or more network connections, and
wherein the program code further causes the system to simultaneously display a plurality of chat windows on the display of the agent interface device and display within each one of the chat windows at least a portion of a conversation between an individual one of the users and the agent, whereby the agent can simultaneously participate in the plurality of chat sessions,
wherein the program code further causes the system to display within each chat window on the display of the agent interface device a respective unsent message being displayed in a message composition area of a chat window displayed on each user interface device so that the agent can simultaneously view pre-message text input at each user interface device while each user is composing the respective unsent message that is not part of a conversation.

6. A system as defined in claim 1,
wherein the secondary interface device is configured to be connected with the user interface device and the agent interface device via one or more network connections, the secondary interface device comprising a display,
wherein the program code further causes the system to:
display a chat monitor window on the display of the secondary interface device;
display within the chat monitor window at least a portion of the conversation between the user and the agent;
update the displayed conversation in each chat window when an additional user message or agent message is sent; and
simultaneously update the displayed conversation in the chat monitor window when the additional user message or agent message is sent, whereby the additional agent can monitor the user-initiated chat session in real-time via the secondary interface device.

7. A system as defined in claim 6, the system being further configured to:
display an additional chat window on the display of the agent interface device when the additional chat session between the agent and the additional agent is established;
display within the additional chat window at least a portion of the secondary conversation between the agent and the additional agent, wherein the secondary conversation comprises messages composed at and sent from the secondary interface device and messages composed at and sent from the agent interface device during the additional chat session, whereby the additional agent can coach the agent to help guide the conversation between the agent and the user.

8. A system as defined in claim 6, the system being further configured to:
display within each chat window and in the chat monitor window at least a portion of the three-way conversation between the user, the agent, and the additional agent when the additional agent joins the user-initiated chat session, wherein the three-way conversation comprises text-containing user messages composed at and sent from the user interface device, text-containing agent messages composed at and sent from the agent interface device, and text-containing additional agent messages composed at and sent from the secondary interface device.

9. A system as defined in claim 6, the system being further configured to:
when the additional agent replaces the agent in the user-initiated chat session, update the displayed conversation in the chat monitor window and in the chat window displayed on the user interface device when an additional user message or an additional message from the additional agent is sent, thereby continuing the displayed conversation to include messages composed at and sent from the secondary interface device and to include no further agent messages;
remove the conversation between the agent and the user displayed in the chat window on the agent interface device; and
establish a new chat session between the replaced agent and a different user in which a new conversation is displayed in respective chat windows on the agent interface device and a different user interface device.

10. A system configured to facilitate electronic chat sessions, the system comprising:
a server configured to simultaneously host a plurality of user-initiated chat sessions; and
a plurality of agent interface devices, each user-initiated chat session being established between an individual user at a user interface device and an agent at one of the plurality of agent interface devices via the server; and
a secondary interface device connected to the server and configured to selectively monitor each one of the established chat sessions,
wherein the server is configured to establish each chat session such that more than one of the chat sessions is between different individual users and the same agent, said more than one of the chat sessions being simultaneously displayed at one of the plurality of agent interface devices being operated by said same agent,
wherein pre-message text input by the user in each chat session is visible to the agent in each respective chat session while the user is composing an unsent message in a message composition area displayed on the corresponding user interface device, said pre-message text also being visible to an operator of the secondary interface device when each respective chat session is being monitored on the secondary interface device,
wherein no unsent message being composed by any of the users is part of a conversation displayed in a conversation area of a chat window on any corresponding user interface device,
wherein the system is further configured to establish and facilitate an additional and separate electronic chat session between said operator and the agent participating in one of the established chat sessions, a conversation between the operator and the agent of the additional and separate electronic chat session being displayed on the corresponding agent interface device and on the secondary interface device but not on any user interface device, and wherein the system is further configured to allow the operator of the secondary interface device to join a monitored electronic chat session such that a three-way conversation is established in an already-displayed chat window that includes a conversation between the agent and the user of the monitored electronic chat session, and wherein the system is further configured to allow the operator of the secondary interface device to replace the agent in the monitored electronic chat session so that the conversation between the agent and the user continues with the operator in place of the agent.

11. A system as defined in claim 10 and further configured to allow said operator of the secondary interface device to establish separate chat sessions with multiple agents at any of the agent interface devices, wherein coaching conversations between said operator and the respective agents of each separately established chat session are displayed on the secondary interface device and on the corresponding agent interface devices but not on any user interface device.

12. A system as defined in claim 11 and further configured to allow said operator of the secondary interface device to replace the agent in any one of said separately established chat sessions to continue an ongoing conversation between the corresponding agent and user.

* * * * *